United States Patent
Tehrani et al.

(10) Patent No.: US 8,234,140 B1
(45) Date of Patent: Jul. 31, 2012

(54) SYSTEM, METHOD, AND COMPUTER PROGRAM PRODUCT FOR RESOURCE COLLABORATION ESTIMATION

(75) Inventors: Saeid Tehrani, Farmington Hills, MI (US); Babak Makkinejad, Troy, MI (US)

(73) Assignee: Hewlett-Packard Development Company, L.P., Houston, TX (US)

(*) Notice: Subject to any disclaimer, the term of this patent is extended or adjusted under 35 U.S.C. 154(b) by 989 days.

(21) Appl. No.: 11/904,084

(22) Filed: Sep. 26, 2007

(51) Int. Cl.
*G06Q 10/00* (2006.01)

(52) U.S. Cl. ...................... 705/7.12; 705/7.13

(58) Field of Classification Search ........... None
See application file for complete search history.

(56) References Cited

U.S. PATENT DOCUMENTS

| | | | | |
|---|---|---|---|---|
| 5,406,476 A | * | 4/1995 | Deziel et al. | 705/7.15 |
| 6,049,776 A | * | 4/2000 | Donnelly et al. | 705/8 |
| 7,366,680 B1 | * | 4/2008 | Creel et al. | 705/10 |
| 7,406,441 B2 | * | 7/2008 | Kimura et al. | 705/26 |
| 7,860,810 B2 | * | 12/2010 | Raffo | 706/6 |
| 2002/0040313 A1 | * | 4/2002 | Hunter et al. | 705/9 |
| 2002/0082889 A1 | * | 6/2002 | Oliver | 705/8 |
| 2003/0018952 A1 | | 1/2003 | Roetzheim | |
| 2003/0070157 A1 | * | 4/2003 | Adams et al. | 717/101 |
| 2003/0163357 A1 | * | 8/2003 | Engleman et al. | 705/7 |
| 2006/0184401 A1 | * | 8/2006 | DelGaudio et al. | 705/7 |
| 2007/0022404 A1 | | 1/2007 | Zhang et al. | |
| 2007/0061179 A1 | * | 3/2007 | Henderson et al. | 705/8 |

* cited by examiner

*Primary Examiner* — Asfand Sheikh

(57) ABSTRACT

A system, method, and computer program product for resource collaboration estimation (RCET). The method includes determining types of human resources to be used for a project. The method also includes calculating and storing an effort full time equivalent (FTE) according to the types of human resources. The method also includes calculating and storing a communication FTE according to the types of human resources. The method can also calculate the total effort of each team per phase based on additional communication overhead, and derive the total cost and duration based on the number of FTEs. A data processing system includes various means for performing corresponding steps, and a computer program product includes instructions for executing corresponding steps.

21 Claims, 3 Drawing Sheets

US 8,234,140 B1

SYSTEM, METHOD, AND COMPUTER PROGRAM PRODUCT FOR RESOURCE COLLABORATION ESTIMATION

TECHNICAL FIELD

The present disclosure is directed, in general, to resource estimation.

BACKGROUND OF THE DISCLOSURE

When a company bids or contracts to perform a service or develop a product for a customer, it is often necessary to estimate the number of part-time and full-time project team members that will be required. Generally, a rudimentary method is used to determine the team size, by estimating the number of required Full Time Equivalents (FTEs) as the total amount of effort needed in hours divided by the duration of the project months and the number of FTE work hours in a month. The resulting FTE figure is the estimated number of FTEs needed to be working each month, which can then be satisfied by full-time employees, part-time employees, or a combination of these.

These types of calculations are necessarily inaccurate since they cannot take into account many other factors that may effect the result, including the skill set and structure of the team, the efficiency of work and communications, and many other factors. Often, the projects fail because these kinds of efforts are not considered.

In fact, a typical approach in project management has been to try to account for the collaboration overhead by adjusting the estimate based on a "gut" feel of what more may be required using a percentage of the original estimate as additional overhead, another approach that is typically inaccurate and inconsistent. Further, most generalized estimations fail to consider or account for a significant source of inefficiency.

There is, therefore, a need in the art for a system, method, and computer program product for improved resource estimation.

SUMMARY OF THE DISCLOSURE

Various disclosed embodiments include a system, method, and computer program product for resource estimation. The method includes determining types of human resources required for a project. The method also includes calculating and storing an effort full-time-equivalent (FTE) according to the types of human resources. The method also includes calculating and storing a communication FTE according to the types of human resources. A data processing system includes various means for performing corresponding steps, and a computer program product includes instructions for executing corresponding steps.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
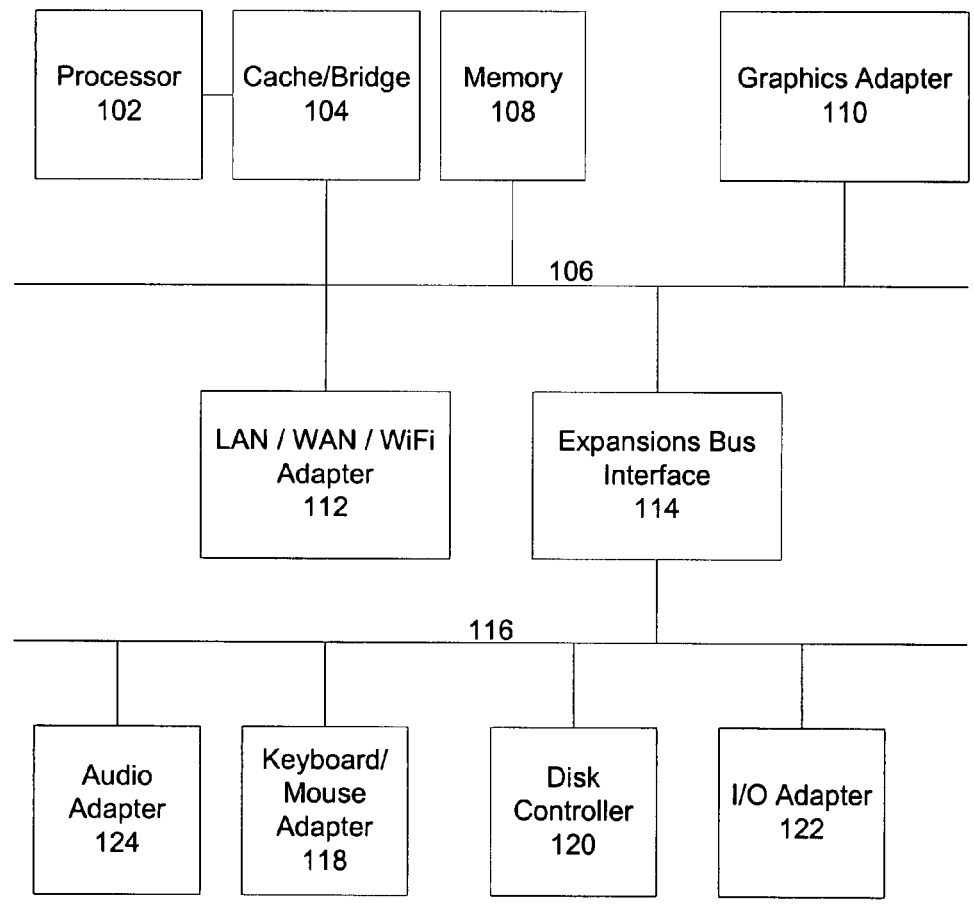
FIG. 1 depicts a block diagram of a data processing system in which an embodiment can be implemented.
Figure 2:
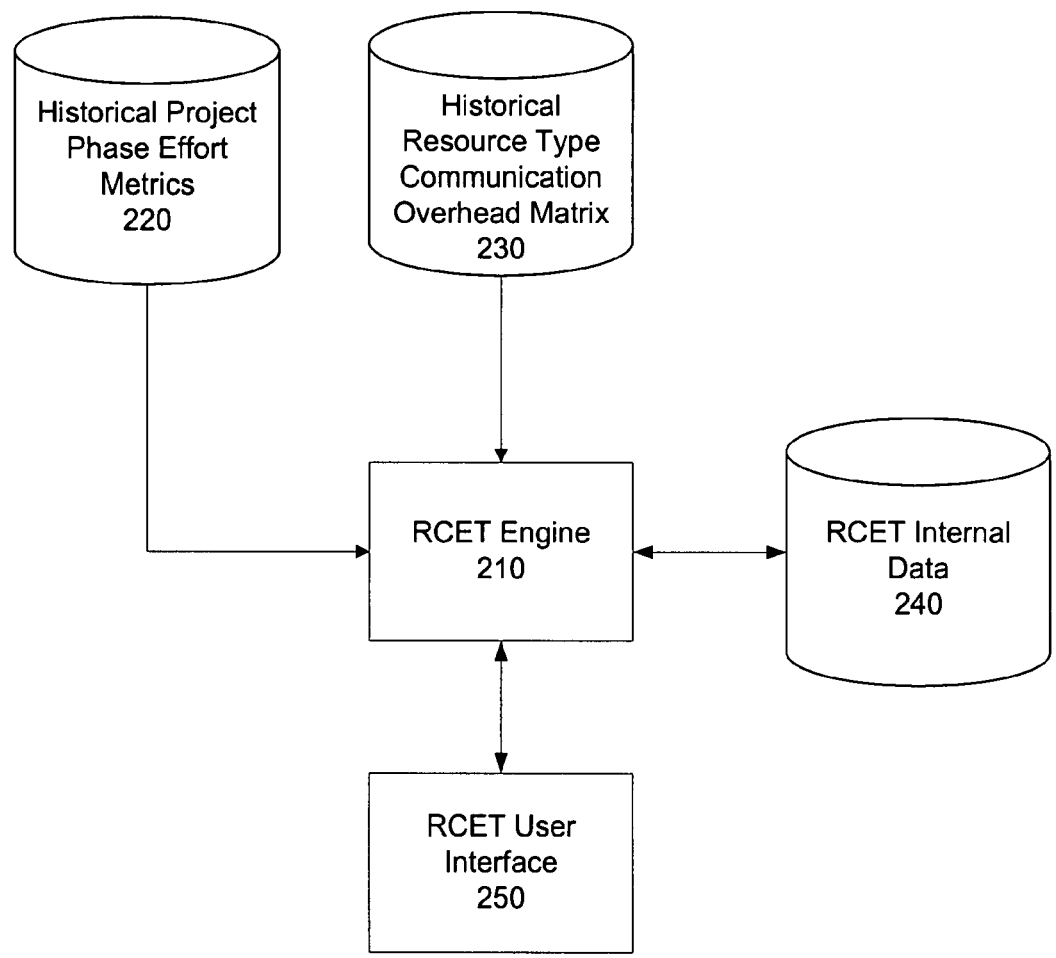
FIG. 2 depicts a block diagram of a resource collaboration estimation tool (RCET) in accordance with a disclosed embodiment.
Figure 3:
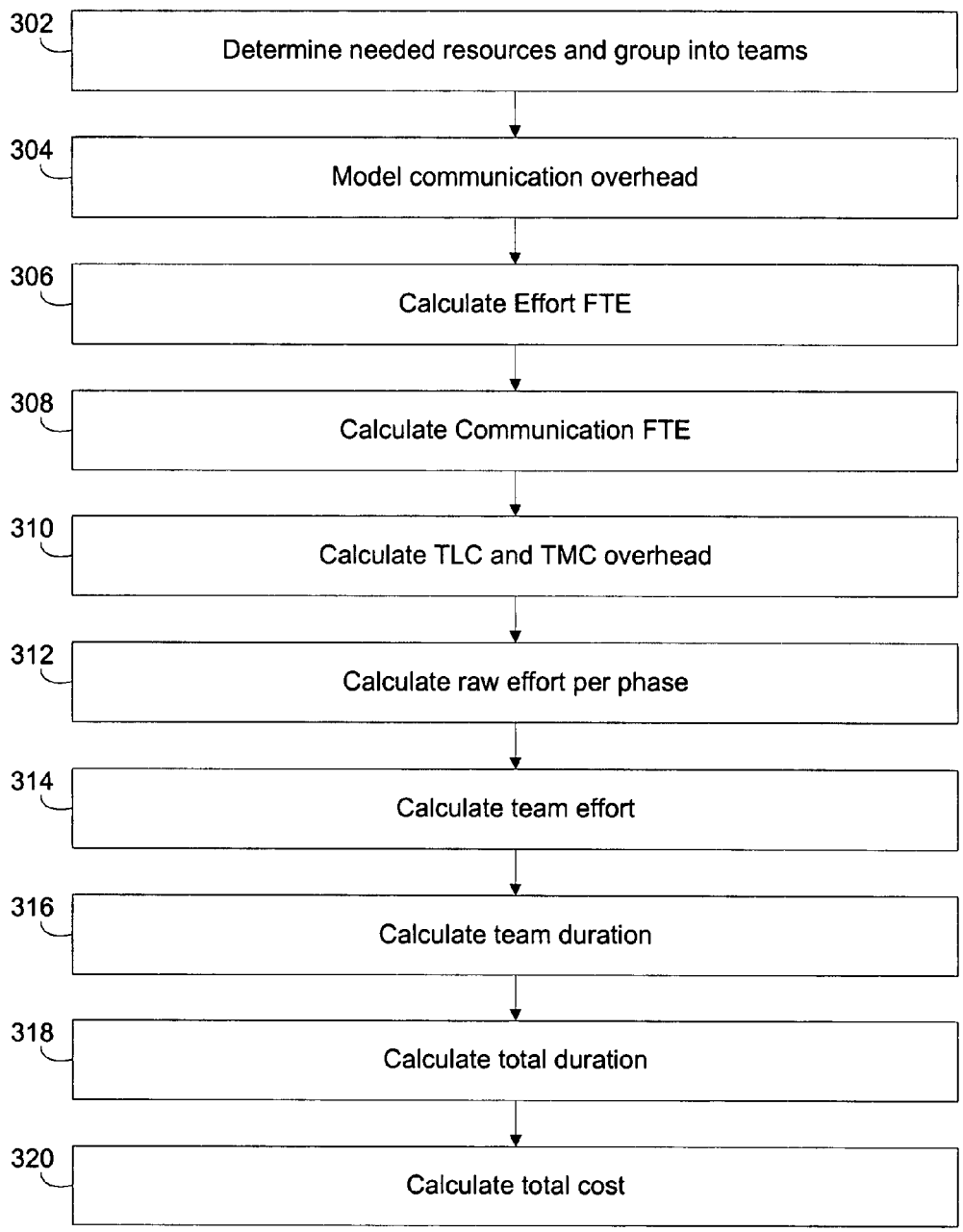
FIG. 3 depicts a flowchart of a process performed by the RCET, in accordance with a disclosed embodiment.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

FIG. 1 depicts a block diagram of a data processing system in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

As discussed above, typical resource estimations fail to consider a significant source of inefficiency. Most standard approaches do not take into account that the team members are human beings who need to communicate with one another and the rate of communication is very slow. Team members in any project spend significant amounts of their time interacting, communicating and collaborating with one another by participating in meetings, reviewing and participating in one-on-one discussions. These communications/collaborations, and the need to so communicate/collaborate, can significantly add to the amount of total effort and hence duration. To reduce the time back to the an acceptable or agreed duration, the number of required resources will have to increase which in turn will increase the additional collaboration effort. This increase in the amount of effort is exponential and it is known and can be shown by this tool that passed certain number of resources, adding more resources will no longer reduce the duration.

There are other tools that can estimate the total number of FTEs based on historical estimates of almost similar projects in the past using some probability factors. But these tools do not provide the team structure and do not estimate the amount of additional overhead due to collaboration between team members based the size and structure of the team and the type of project. To compensate for unknown inefficiencies, many estimations will double the size of the estimated FTE team members required, but still under estimate the total effort because team communications and interactions are not considered, and the interaction between the team will increase non-linearly. It is a common phenomenon that adding more resources does not reduce the duration to complete the project. It is known that for a certain size project, the duration cannot be lowered more than certain amount regardless of the size of the team. That is, there is a minimum duration for each project which cannot be reduced any further no matter how many resources will be added. The cost, however, is increasing as resources are added. In fact, past a certain point, the duration can increase as new members being added to the team. If duration is important (urgency of the project), the scope must be decreased. Note that, when the term "FTE" is used generically herein, it refers to full time equivalent human resources (or simply "resources"), whether employees, contractors or otherwise, used in a project.

The pure effort in a project estimate can be viewed as pure energy while the interaction between the team members can be viewed as unavoidable friction. This friction goes up exponentially as the team size grows. Each individual spends certain amount of his energy (the effort assigned to him) toward interactions with others. Interacting with others depends on the roles that individuals play; some individuals have to communicate all the time, e.g., the technical lead, while others have lower percentage of their time spent in communications with others, e.g., low level developers. Note that this approach does not take into account the training and learning curve for the new developers. This additional overhead can be added as constants to the equations.

The task of determining the project team's composition in types of resources can be determined from the type of the project at hand. During the estimation, the team can determine the amount of effort for each phase and what types of resources are needed for each phase of the project. Dividing the team into sub-teams can improve the organization and control of the plan. However, the teams do not finish their tasks at the same time and the total duration depends on the team that is lagging behind, which can be due to too much work for the given number of resources. Adding more resources to the distressed team can reduce the duration, but will increase interactions to the other team members. The additional interactions and communications in a larger team cause inefficiencies, slowing down the entire project progress. If the exact number of members for each sub-team and the amount of communication are known, a new total effort and duration can be computed for each phase as well as for the entire project.

As the term is generally used herein, a large team is one that is comprised of multiple smaller sub-teams. In many cases, each sub-team will have a tech lead under the supervision of a tech director. For smaller project teams, there may be only one tech lead and no tech director.

Knowing the quantitative amount of communication of each team member using the communication model and the effort assigned to each per phase, one can predict the additional overhead per phase. This determines the total effort and duration for each sub-team. The number of sub-team members can be iteratively adjusted to reduce the duration for the team with the largest duration to the nearest month and week. The cost of the entire project depends on the number of FTE in a given month multiplied by the duration of the project, since it is not practical to continuously hire and fire team members between phases. An optimization routine, not described herein, can be used to minimize the cost and duration based on a certain merit function as a quantitative model of this communication overhead can be calibrated in reference to the actual project metrics.

Disclosed embodiments include a resource collaboration estimation tool (RCET), implemented as a system, method, and computer program product, that models and computes a more realistic estimate for each phase of the project based on the additional communication overhead between team members. The various steps below can be performed using appropriate data processing systems means, including processor 102 for performing various calculations and determinations, and memory 108 and disk control 120 for storage, and LAN/WAN/WiFi adapter 112 for communications.

The RCET, according to various disclosed embodiments, addresses the need for a more accurate resource estimation for a project by considering communication/collaboration between the team members. Various embodiments include a quantitative estimation of communication overhead effort based on historical records of previous projects.

Various embodiments consider a distinction between full-time and part-time resources. While a part-time employee's communication overhead can typically be proportional to his time commitment to the project, the overhead required by a part-time employee is still more than just being proportional to his time commitment. In other words, part-time resources contribute more to the overall communication overhead of the project relative to their effort than full-time resource. For example, adding 10 part-time resources to a team at 10% commitment is not equivalent to one full time equivalent (FTE) resource due to amount of communication/collaboration overhead required.

In general, the value of the communication overhead is a complex function of types of resources and the percentage of commitment. This function can be empirically derived from the analysis of historical projects' metrics.

FIG. 2 depicts a block diagram of a resource collaboration estimation tool (RCET) in accordance with a disclosed embodiment. The disclosed RCET includes RCET engine 210, which is connected to retrieve and use data from various datastores, which can be implemented as a combined datastore, or multiple databases, or hard programmed, or with data retrieved or loaded on demand. For example RCET engine 210 can use data including historical project phase effort metrics 220, which includes historical data of the effort required for various phases of different projects, and historical resource type communication overhead matrix 230, which includes data relating communication overhead to various resource types and phases, as described herein. RCET engine 210 also includes RCET internal data 240. RCET user interface 250 allows users to interact with RCET engine 210, and can display the results of any step described herein. Any data calculated or determined can be stored in any volatile or nonvolatile storage, including memory 108.

FIG. 3 depicts a flowchart of a process 300 performed by the RCET, in accordance with a disclosed embodiment. As described herein, the process can be performed, for example, by the RCET using the RCET Engine 210, or by a data processing system such as data processing system 100, or by a special-purpose controller, ASIC, or other device, or by a general-purpose data processing system executing a computer program product encoded with computer-executable instructions corresponding to various process steps described herein.

The disclosed RCET calculates the communication overhead, effort per phase, and total duration of a project. The disclosed RCET calculates the communication/collaboration overhead based on the types of human resources needed for a project when grouped into teams. The disclosed RCET determines the types of human resources to be used for a project which are or can be grouped into sub-teams (step 302). In some embodiments, the types of resources are predefined based on the type of the project. This method can calculate the additional effort and cost, and resulting duration. The number of resources in each sub-team can be manually adjusted to obtain the best cost, duration, or combination of the two. In cases where the types of resources are predefined, "determining" the types of human resources to be used can include loading, retrieving, or receiving the predetermined types from a user, a database, or otherwise.

For large size projects, the disclosed RCET can calculate the overhead based on the teams organized in a hierarchy. Note that typically hierarchical teams will reduce redundant communication between all leads and low level developers. The disclosed RCET can handle both small size projects with small teams and one tech lead and one project manager for the entire project, or multiple teams with their own tech leads and director supervising the tech leads, and multiple project managers.

The disclosed RCET models the communication overhead, by recognizing teams and their team leaders as participants in a communication network (step 304). The communication between team members can be modeled based on the roles each team member is playing in connection with other team members. For simplicity and without any loss of generality, the interactions are modeled to be symmetric between two roles. This symmetric interaction factor between two roles is a function of the two role types which can be represented in a two dimensional matrix. In general, the team is assumed to be hierarchical. For example, a tech lead has certain communication with his team, with other tech leads, and with the technical director and project management.

The amount of communication also depends on the number of team members and not necessarily on the number of FTEs. That is, while two 50% part-time resources can be equivalent to one FTE in terms of effort, they require more than one FTE in terms of communication effort.

One way of representing this complex function, which describes the communication and collaboration efforts between different roles, is by using a matrix that captures the percentage of communication and collaboration effort between two roles in a project based on historical data derived from similar projects. The disclosed RCET uses this matrix to calculate the Communication FTE (CFTE).

The following table describes the communication function using the percentage of communication between two roles (as a percentage of their own effort) which can be different or similar between roles. For example, Data-Base Administrators (DBA) may each spend 50% of their time interacting with one another but spends only 5% of their time interacting with J2EE developers (or J2EE technical leader when each sub-team has a technical leader).

In a simple case, the table is assumed to be symmetrical about its diagonal but this is not the general case. That is, DBA may spend 5% of their own effort with J2EE developers but J2EE developers may spent 10% of their effort with DBAs.

TABLE 1

Collaboration percentages between resource types.

| One-to-one Communication % by Role (or Resource Type) | Architect | Tech Leader | J2EE Developer | DBA | Reporting | Testing |
|---|---|---|---|---|---|---|
| Architect | 50.0% | 40.0% | 10.0% | 10.0% | 20.0% | 10.0% |
| Technical Leader | 40.0% | 50.0% | 10.0% | 60.0% | 50.0% | 40.0% |
| J2EE Developer | 10.0% | 10.0% | 5.0% | 5.0% | 5.0% | 5.0% |
| DBA | 10.0% | 60.0% | 5.0% | 50.0% | 15.0% | 5.0% |
| Reporting | 20.0% | 50.0% | 5.0% | 15.0% | 30.0% | 15.0% |
| Testing | 10.0% | 40.0% | 5.0% | 5.0% | 15.0% | 20.0% |

The disclosed RCET calculates the Effort FTE (EFTE) and Communication FTE (CFTE) for a sub-team. EFTE is used when duration is calculated based on the total efforts for a team or when the cost is used for a team, and reflects the actual number of FTEs required in terms of work hours. CFTE is used to calculate the communication overhead for the project, and it reflects the cost of communications between resources. Normally CFTE is greater than EFTE because part-time resources have to be informed as much as full-time resources relative to the time spent on the project. This result is stored and/or displayed.

The disclosed RCET calculates the Effort FTE (EFTE), Communication FTE (CFTE), additional communication overhead, duration and total cost. These calculations can be carried out for 1) a small flat structure (part-time or full-time) team with one or more technical leaders who supervise the whole project and all members communicate with each other, or for 2) a large (part-time or full-time) team with a hierarchical structure which has sub-teams led by one or more technical leaders. In this case for efficiency reasons, the communication is more limited. That is, the members of a sub-team only communicate with their sub-team members and their technical leader; they don't communicate cross teams. The technical leaders communicate with each other to pass the solutions to their own sub-teams.

The equations for EFTE is similar in both cases. The disclosed RCET calculates the Effort FTE (EFTE) for a flat structure as:

$$EFTE_i = \frac{\sum_{resource\text{-}type\text{-}members}(R_i * H(R_i))}{h_i}$$

Where $R_i$ is the number of resources for a resource type indexed by i, $H(R_i)$ is the number of hours that a resource type indexed by i works per month, and $h_i$ is the total number of hours per month a standard FTE of resource type i works per month (step 306). Note, as used herein, resource types, roles, and sub-teams can be synonymous. Sub-team is used for hierarchical team structure. EFTE can be calculated for the entire team (case 1) or for each sub-team (case 2). Note that typically $h_i$ is a corporate standard number and the same for all resources types. However, if each resource type spends different amount of time per month, $h_i$ can be defined per resource type in the above equation. This result is stored and/or displayed.

The disclosed RCET calculates the Communication FTE (CFTE) as:

$$CFTE_i = \sum_{resource\text{-}type\text{-}members}\left(R_i * \frac{C(R_i)}{H(R_i)}\right)$$

where $R_i$ is the number of resources for a sub-team, $C(R_i)$ is the percentage of a resource full-time/part-time communication and $H(R_i)$ is the number of hours that resource type works per month (step 308). This result is stored and/or displayed.

The disclosed RCET models the communication overhead between technical leaders and team members (step 310). For each team leader, the disclosed RCET can compute the communication overhead caused by communication between that technical lead and other technical leads (TLC) and the overhead caused by communication among the same team members (TMC) based on the symmetric matrix.

In the case of flat structure, the communication overhead is computed by using the Communication FTE (CFTE) factor and the percentage of communication among team members of similar or different resource types.

$$C_i = \sum_{i \neq j}(CFTE_i * M(i, j))$$

where $CFTE_i$ is the Communication FTE for resource type i and $M(i, j)$ is the matrix containing the communication factor for resource types i and j (See Table 1).

In the case of hierarchical structure, technical leader communication with other technical leaders only which can be calculated as:

$$TLC_i = \sum_{i \neq j}(CFTE_i * M(i, j))$$

where $CFTE_i$ is the Communication FTE for resource type i and $M(i, j)$ is the matrix containing the communication factor for resource types i and j who are technical leaders (See Table 1).

Team members only communicate within a sub-team. The communication between sub-team members including their technical leader(s) can be calculated as:

$$TMC_i = CFTE_i * M(i,i)$$

where $CFTE_i$ is the Communication FTE for resource type i and $M(i, j)$ is the matrix containing the communication factor for resource types i and j (See Table 1).

Therefore, the following is a general formula for the sum of the communication overhead:

$$C_i = TLC_i + TMC_i$$

where $C_i$ is the communication overhead for resource type indexed by i. $TMC_i$ and $TLC_i$ are the communication overhead for sub-team members and tech leads described above, respectively. These results are stored and/or displayed.

The disclosed RCET calculates the amount of raw effort for each team per phase based on their percent contribution to the phase (step 312). The percentages are normalized so that the total effort of all teams for each phase is equal to the effort for that phase. This result is stored and/or displayed.

From the percentage of communication overhead, the disclosed RCET computes the new sub-team effort (step 314) for sub-team j and for each phase of the project.

$$E_j = h_i * C_j + e_j$$

where $e_j$ is the original effort for each sub-team per phase, $C_j$ is the Communication overhead, $h_i$ is the total number of hours per month a standard FTE works per month, and $E_j$ is the new effort including the collaboration per phase. Thus, the above equation can be calculated per each phase. This result is stored and/or displayed.

The disclosed RCET computes the duration for each team (step 316) for each phase as:

$$D_i(\text{Phase}) = \frac{E_i}{h_i * EFTE_i}$$

The disclosed RCET computes the total duration for all phases.

$$D_i \Sigma_{phase} D_i(\text{phase})$$

This result is stored and/or displayed.

The disclosed RCET calculates the total duration (step 318) as:

$$D = \max(D_j)$$

which means:

$$D = \max(\Sigma_{phase} D_i(\text{phase}))$$

and the duration rounded to a month as:

$$\lceil D \rceil \text{CEILING}(D)$$

Or, can be rounded to a week (based on the project resource allocation preference) as:

$$\lceil D \rceil = \frac{\text{CEILING}(4*D)}{4}$$

These results are stored and/or displayed.

The cost can be calculated in many different ways. In a simple case where all receive the same salary, the disclosed RCET calculates the total cost (step 320) as:

$$\text{Cost} = S * \lceil D \rceil * \Sigma EFTE_i$$

where S the salary of a resource per month.

In a typical case where the salary is different for each resource type, the disclosed RCET calculates the total cost (step 320) as:

$$\text{Cost} = \lceil D \rceil * \Sigma(EFTE_i * S_i)$$

where $S_i$ is the salary of resource type indexed by i per month. In the most general case where the salary is different for every resource, the disclosed RCET calculates the total cost (step 320) as:

$$\text{Cost} = \lceil D \rceil * \sum \left( S_i * \frac{H(R_i)}{h_i} \right)$$

where $S_i$ is the salary of each resource indexed by i per month. $H(R_i)$ is the number of hours that a resource type indexed by i works per month, and $h_i$ is the total number of hours per month a standard FTE of resource type indexed by i works per month.

Since typically, resources are allocated more long term, this cost equation assumes that the team members are allocated for the duration of the project. If there are other policies for resource allocations, it can be formulated as needed. This result is stored and/or displayed.

Note that if the teams have to wait for an approval at the each of each phase and cannot continuously work the duration has to be calculated as:

$$D = \Sigma_{phase} \max(D_i(\text{phase}))$$

and the rounding will be as described above.

Of course, those of skill in the art will understand that depending on the output required and other factors, not every step described above need be performed in every implementation. Further, the steps above need not be performed in the precise order described; indeed, some steps can be performed in different orders or concurrently with other steps.

In some implementations, a spreadsheet program such as Microsoft® Excel and its macro language capability can be used to implement some functions of the disclosed RCET, though other embodiments can be implemented using other tools and programming languages, etc. The disclosed RCET takes the user's input values for the number and types of various resources for each technical team (for both part-time or full-time resources), and computes the actual effort hours that such a combination of resources will consume by including the communication overhead. By varying the number of part-time/full-time resources, the optimum duration can be determined.

In various embodiments, the disclosed RCET can use project metrics data from another spreadsheet file or datastore rather than historical corporate data, but any appropriate source of project metrics and historical data can be used.

In various embodiments, the disclosed RCET stores metrics data and resulting into internal or external spreadsheet cells, or using other known storage techniques.

In various embodiments, the disclosed RCET indicates how the total FTE changes as more or less resources are added or subtracted.

The stored data is useful for optimization processes, not described in detail herein, to determine the optimal team structure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read-only memories (ROMs) or erasable, electrically programmable read-only memories (EEPROMs), and user-recordable type mediums such as floppy disks, hard disk drives, compact disk read-only memories (CD-ROMs) or digital video disks (DVDs), and so on.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for resource collaboration estimation, comprising:
   with a processor, determining types of human resources to be used for a project;
   with a resource collaboration estimation tool (RCET), calculating an effort full time equivalent (FTE) according to the types of human resources;
   storing the effort full time equivalent (FTE) in a memory storage device;

with the resource collaboration estimation tool (RCET), calculating a communication FTE according to the types of human resources; and storing the communication FTE in the memory storage device.

2. The method of claim 1, further comprising modeling a communication overhead by recognizing the types of human resources as participants in a communications network.

3. The method of claim 1, further comprising calculating and storing a technical leader communication overhead.

4. The method of claim 1, further comprising calculating and storing a team member communication overhead.

5. The method of claim 1, further comprising calculating and storing a raw effort per phase for a plurality of project teams.

6. The method of claim 1, further comprising calculating and storing a total project duration according to the effort FTE and communication FTE.

7. The method of claim 1, further comprising calculating and storing a total project cost.

8. A data processing system comprising:
a processor; and
accessible memory,
wherein the data processing system is configured to determine types of human resources to be used for a project;
calculate and store an effort full-time-equivalent (FTE) according to the types of human resources; and
calculate and store a communication FTE according to the types of human resources.

9. The data processing system of claim 8, wherein the data processing system is further configured to model a communication overhead by recognizing the types of human resources as participants in a communications network.

10. The data processing system of claim 8, wherein the data processing system is further configured to calculate and store a technical leader communication overhead.

11. The data processing system of claim 8, wherein the data processing system is further configured to calculate and store a team member communication overhead.

12. The data processing system of claim 8, further wherein the data processing system is further configured to calculate and store a raw effort per phase for a plurality of project teams.

13. The data processing system of claim 8, wherein the data processing system is further configured to calculate and store a total project duration according to the effort FTE and communication FTE.

14. The data processing system of claim 8, wherein the data processing system is further configured to calculate and store a total project cost.

15. A computer program product for resource collaboration estimation, the computer program product comprising:
a computer readable storage medium having computer usable program code embodied therewith, the computer usable program code comprising:
computer usable program code that determines types of human resources to be used for a project;
computer usable program code that calculates an effort full-time-equivalent (FTE) according to the types of human resources;
computer usable program code that stores the effort full-time-equivalent (FTE);
computer usable program code that calculates a communication FTE according to the types of human resources; and
computer usable program code that stores the communication FTE.

16. The computer program product of claim 15, further comprising computer usable program code that models a communication overhead by recognizing the types of human resources as participants in a communications network.

17. The computer program product of claim 15, further comprising:
computer usable program code that calculates a technical leader communication overhead; and
computer usable program code that stores the technical leader communication overhead.

18. The computer program product of claim 15, further comprising:
computer usable program code that calculates a team member communication overhead; and
computer usable program code that stores the team member communication overhead.

19. The computer program product of claim 15, further comprising:
computer usable program code that calculates raw effort per phase for a plurality of project teams.

20. The computer program product of claim 15, further comprising:
computer usable program code that calculates a total project duration according to the effort FTE and communication FTE; and
computer usable program code that stores the total project duration.

21. The computer program product of claim 15, further comprising:
computer usable program code that calculates a total project cost; and
computer usable program code that stores the total project cost.

* * * * *